US008407321B2

(12) United States Patent
Mickens et al.

(10) Patent No.: US 8,407,321 B2
(45) Date of Patent: Mar. 26, 2013

(54) CAPTURING WEB-BASED SCENARIOS

(75) Inventors: James Mickens, Bellevue, WA (US); Jon Howell, Seattle, WA (US); Jeremy Elson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 102 days.

(21) Appl. No.: 12/764,104

(22) Filed: Apr. 21, 2010

(65) Prior Publication Data

US 2011/0264787 A1 Oct. 27, 2011

(51) Int. Cl.
*G06F 15/173* (2006.01)
(52) U.S. Cl. ...... 709/220; 709/218; 709/228; 707/104.1
(58) Field of Classification Search .................. 709/218, 709/220, 227; 707/104.1
See application file for complete search history.

(56) References Cited

U.S. PATENT DOCUMENTS

| 6,317,786 | B1 | 11/2001 | Yamane et al. |
| 7,139,978 | B2 | 11/2006 | Rojewski et al. |
| 7,673,181 | B1* | 3/2010 | Lindo et al. ............... 714/38.13 |
| 8,079,019 | B2* | 12/2011 | Lindo et al. .................. 717/129 |
| 2004/0054715 | A1 | 3/2004 | Cesario |
| 2004/0254942 | A1* | 12/2004 | Error et al. ................ 707/100 |
| 2006/0101404 | A1 | 5/2006 | Popp et al. |
| 2008/0005793 | A1 | 1/2008 | Wenig et al. |
| 2008/0010338 | A1* | 1/2008 | Curtis et al. .................. 709/203 |
| 2008/0010386 | A1* | 1/2008 | Curtis et al. .................. 709/246 |
| 2008/0016113 | A1* | 1/2008 | Theobald et al. .......... 707/104.1 |
| 2008/0052377 | A1* | 2/2008 | Light ............................ 709/218 |
| 2008/0072239 | A1 | 3/2008 | Liang et al. |
| 2008/0177994 | A1* | 7/2008 | Mayer ............................... 713/2 |
| 2009/0006574 | A1 | 1/2009 | Horvitz et al. |
| 2009/0133033 | A1* | 5/2009 | Lindo et al. .................... 718/108 |
| 2011/0022962 | A1* | 1/2011 | Luo et al. ........................ 715/745 |

OTHER PUBLICATIONS

Niño, et al., "CARENA: A Tool to Capture and Replay Web Navigation Sessions", Retrieved at << http://ieeexplore.ieee.org/xpl/freeabs_all.jsp?arnumber=1564474 >>, E2EMON, Proceedings of the End-to-End Monitoring Techniques and Services on 2005. Workshop, May 15, 2005, pp. 15.
Elbaum, et al., "Improving Web Application Testing with User Session Data", Retrieved at << http://portal.acm.org/citation.cfm?id=776816.776823&type=series >>, International Conference on Software Engineering, Proceedings of the 25th International Conference on Software Engineering, May 3-10, 2003, pp. 11.
Freire, et al., "VeriWeb: Automatically Testing Dynamic Web Sites", Retrieved at << http://www2002.org/presentations/freire.pdf >>, In Proceedings of 11th International World Wide Web Conference (WWW'2002), 2002, pp. 1-27.
Whitaker, et al., "Configuration Debugging as Search: Finding the Needle in the Haystack", Retrieved at << http://www.usenix.org/events/osdi04/tech/full_papers/whitaker/whitaker.pdf >>, Operating Systems Design and Implementation, Proceedings of the 6th conference on Symposium on Opearting Systems Design & Implementation—vol. 6, Dec. 6-8, 2004, pp. 77-90.
Hackett, Matt., "Spacius! A Space Adventure", Retrieved at << http://scriptnode.com/lab/spacius/ >>, Jul. 8, 2008, pp. 1.
"V8 JavaScript Engine", Retrieved at << http://code.google.com/apis/v8/benchmarks.html >>, Retrieved Date: Dec. 1, 2009, p. 1.

(Continued)

*Primary Examiner* — Khanh Dinh

(57) ABSTRACT

This patent application pertains to capturing web-based scenarios. One example detects execution of a web application. This example also automatically captures non-deterministic events of the execution in a manner that is transparent to a user of the web application.

17 Claims, 4 Drawing Sheets

OTHER PUBLICATIONS

"DOMTRIS A Tetris Clone Made with DOM & JavaScript by Jacob Seidelin", Retrieved at << http://www.nihilogic.dk/labs/tetris/ >>, Retrieved Date: Dec. 4, 2009, p. 1.

"PacMan!", Retrieved at << http://www.digitalinsane.com/api/yahoo/pacman/ >>, Retrieved Date: Dec. 1, 2009, p. 1.

Bell, Joshua., "Applesoft BASIC Interpreter in Javascript", Retrieved at << http://www.calormen.com/applesoft/ >>, Retrieved Date: Dec. 1, 2009, pp. 7.

"NicEdit", Retrieved at << http://nicedit.com/ >>, Retrieved Date: Dec. 1, 2009, pp. 2.

"Canvas Painter", Retrieved at << http://caimansys.com/painter/ >>, Retrieved Date: Dec. 1, 2009, p. 1.

"JavaScript Shell a Command-Line Interface for JavaScript and DOM.", Retrieved at << http://www.squarefree.com/shell >>, Retrieved Date: Dec. 1, 2009, pp. 2.

"Breakpad—MozillaZine Knowledge Base Breakpad", Retrieved at << http://kb.mozillazine.org/Breakpad >>, Retrieved Date: Dec. 1, 2009, pp. 4.

"Technical Note TN2151Crash Reporting for iPhone OS Applications", Retrieved at << http://developer.apple.com/iphone/library/technotes/tn2008/tn2151.html >>, Retrieved Date: Dec. 1, 2009, pp. 2.

Bouteiller, et al., "Retrospect: Deterministic Replay of MPI Applications for Interactive Distributed Debugging", Retrieved at << http://www.springerlink.com/content/1866034122t35878/fulltext.pdf >>, Lecture Notes in Computer Science, Recent Advances in Parallel Virtual Machine and Message Passing Interface, vol. 4757/2007, 2007, pp. 297-306.

Choi, et al., "Deterministic Replay of Java Multithreaded Applications", Retrieved at << https://eprints.kfupm.edu.sa/34791/1/34791.pdf >>, Symposium on Parallel and Distributed Tools, Proceedings of the SIGMETRICS symposium on Parallel and distributed tools, Aug. 3-4, 1998, pp. 1-12.

"Web Analytics Revolution", Retrieved at << http://www.clicktale.com/ >>, Retrieved Date: Dec. 4, 2009, pp. 4.

Cornelis, et al., "A Taxonomy of Execution Replay Systems", Retrieved at << http://citeseerx.ist.psu.edu/viewdoc/summary?doi=10.1.1.58.9129 >>, In Proceedings of the International Conference on Advances in Infrastructure for Electronic Business, Education, Science, Medicine, and Mobile Technologies on the Internet, 2003, pp. 10.

Dionne, et al., "A Taxonomy of Distributed Debuggers Based on Execution Replay", Retrieved at << http://citeseerx.ist.psu.edu/viewdoc/summary?doi=10.1.1.52.4538 >>, In Proceedings of the 1996 International Conference on Parallel and Distributed Processing Techniques and Applications, 1996, pp. 12.

Dunlap, et al., "Revirt: Enabling Intrusion Analysis through Virtual-Machine Logging and Replay.", Retrieved at << http://www.eecs.umich.edu/virtual/papers/dunlap02.pdf >>, Operating Systems Design and Implementation, Proceedings of the 5th symposium on Operating systems design and implementation Due to copyright restrictions we are not able to make the PDFs for this conference available for downloading, Dec. 9-11, 2002, pp. 14.

Geels, et al., "Replay Debugging for Distributed Applications", Retrieved at << http://www.usenix.org/events/usenix06/tech/geels/geels.pdf >>, USENIX Annual Technical Conference, Proceedings of the annual conference on USENIX '06 Annual Technical Conference, May 30-Jun. 3, 2006, pp. 289-300.

Glerum, et al., "Debugging in the (very) Large: Ten Years of Implementation and Experience", Retrieved at << http://research.microsoft.com/apps/pubs/default.aspx?id=81176 >>, In Proceedings of the 22nd ACM Symposium on Operating Systems Principles (SOSP '09), Oct. 2009, p. 1.

Hewitt, Joe., "Ajax Debugging with Firebug", Retrieved at << http://ajaxian.com/archives/ajax-debugging-with-firebug >>, Jan. 18, 2007, p. 1.

Kiciman, et al., "AjaxScope: A Platform for Remotely Monitoringthe Client-Side Behavior of Web 2.0 Applications", Retrieved at << http://www.sosp2007.org/papers/sosp095-kiciman.pdf >>, ACM Symposium on Operating Systems Principles, Proceedings of twenty-first ACM SIGOPS symposium on Operating systems principles, Oct. 14-17, 2007, pp. 14.

Livshits, et al., "Doloto: Code Splitting for Network-Bound Web 2.0 Applications", Retrieved at << http://research.microsoft.com/en-us/projects/doloto/fse08.pdf >>, Foundations of Software Engineering, Proceedings of the 16th ACM SIGSOFT International Symposium on Foundations of software engineering, Nov. 9-14, 2008, pp. 11.

Narayanasamy, et al., "Recording Application-Level Execution for Deterministic Replay Debugging", Retrieved at << http://cs.ucsb.edu/~arch/spr07-seminar/papers/bugnet-isca05.pdf >>, IEEE Micro, vol. 26, No. 1, Jan. 2006, pp. 100-109.

Park, et al., "Random Number Generators: Good ones are Hard to Find", Retrieved at << http://www.firstpr.com.au/dsp/rand31/p1192-park.pdf >>, Communications of the ACM, vol. 31, No. 10, Oct. 1988, pp. 1192-1201.

"CS SessionReplay: Add Observation to Your Analysis for Even Greater Insight with CS SessionReplay", Retrieved at << http://www.4cresults.com/CSSessionReplay.html >>, Retrieved Date: Dec. 4, 2009, pp. 2.

"Web Application Testing System, S", Retrieved at << http://seleniumhq.org/ >>, Retrieved Date: Dec. 4, 2009, pp. 2.

"Document Object Model (DOM) Level 2 Core Specification", Retrieved at << http://www.w3.org/TR/2000/REC-DOM-Level-2-Core-20001113/DOM2-Core.pdf >>, Editors: Arnaud Le Hors, Philippe Le Hégaret, Lauren Wood, Gavin Nicol, Jonathan Robie, Mike Champion, Steve Byrne, Nov. 13, 2000, pp. 1-107.

Xu, et al., "A "Flight Data Recorder" for Enabling Full-system Multiprocessor Deterministic Replay", Retrieved at << http://www.cs.wisc.edu/multifacet/papers/isca03_flight_data_recorder.pdf >>, In the proceedings of the 30th Annual International Symposium on Computer Architecture (ISCA-30), Jun. 9-11, 2003, pp. 1-12.

Mickens, et al.; "Mugshot: Deterministic Capture and Reply for JavaScript Applications"; Proceedings of the 7th USENIX conference on networked systems design and implementation; Apr. 2010; pp. 1-11.

* cited by examiner

CAPTURING WEB-BASED SCENARIOS

BACKGROUND

Despite developers' best efforts to release high quality code, deployed software inevitably contains bugs. When failures are encountered in the field, many applications/programs record their state at the point of failure, e.g., in the form of a core dump, stack trace, or error log. That snapshot is then sent back to the developers for analysis. Perhaps the best known example is the Windows Error Reporting™ framework, which has collected over a billion error reports from user programs and the kernel.

Unfortunately, isolated snapshots only tell part of the story. The root cause of a bug is often difficult to determine based solely on the program's state after a problem was detected. Accurate diagnosis often hinges on an understanding of the events that preceded the failure. For this reason, some systems have implemented program replay. These frameworks log enough information about a program's execution to replay it later under the watchful eye of a debugging tool. However, these systems require a specially instrumented execution environment like a custom kernel to capture a program's execution. This makes them unsuitable for field deployment to unmodified end-user machines.

SUMMARY

This patent application pertains to capturing web-based scenarios. One example detects execution of a web application. This example also automatically captures non-deterministic events of the execution in a manner that is transparent to a user of the web application.

The above listed example is provided for introductory purposes and does not include all of, and/or limit, the claimed subject matter.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent application pertains to web applications and handling errors that occur when a user is running a web application. Briefly, transparent logging technologies are described that capture non-deterministic events in an executing web application, such as a JavaScript program. Non-deterministic events can be thought of those events whose timing and content are not solely determined by program code, and whose timing and content may be different across different executions of the same code. For instance, if a web-application generates a random number, re-running the web-application may generate a second random number rather than regenerating the first random number. Thus, the present transparent non-deterministic logging techniques can record the first random number for subsequent use in replaying the execution. Non-deterministic events are described in more detail below.

The logged non-deterministic events can be utilized in various scenarios, such as for replay scenarios. Replay can be useful for a variety of reasons. For instance, one reason is failure analysis using debugging tools, performance evaluation, and even usability analysis of a graphical user interface (GUI). The transparent non-deterministic logging technologies can allow replay of execution steps that led to a failure. Accordingly, these transparent non-deterministic logging technologies are far more useful for performing root-cause analysis than today's commonly deployed client-based error reporting systems. Those error reporting systems only give developers a snapshot of the system after a failure has occurred.

First Transparent Non-Deterministic Logging Example

Figure 1:
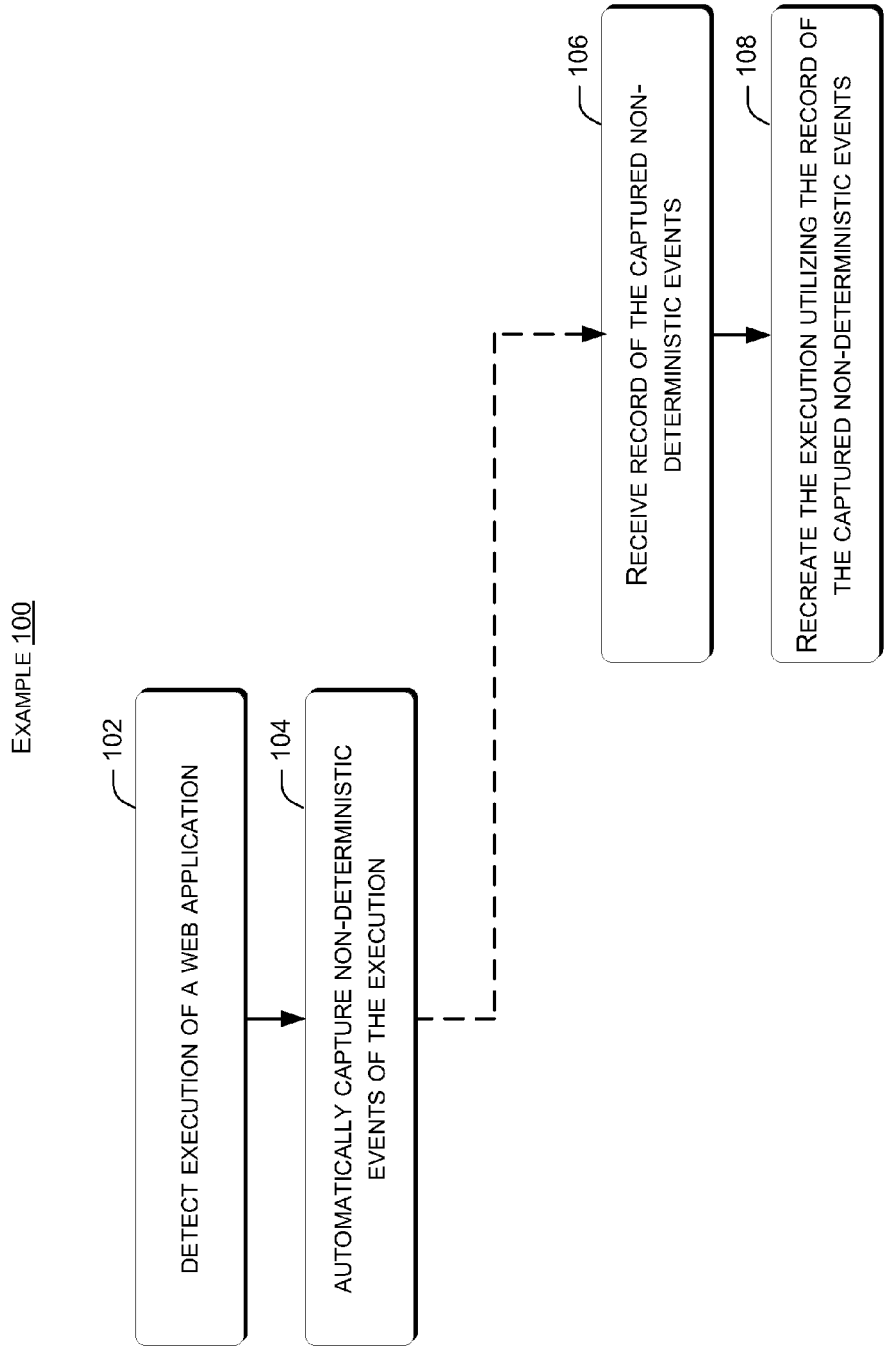
FIGS. 1 and 4 are flow charts for capturing web-based scenarios in accordance with some implementations of the present concepts.

For purposes of explanation consider introductory FIG. 1, which shows a scenario 100 in which transparent non-deterministic logging technologies can be employed.

Execution of a web application can be detected at 102. For example, the web-application can be detected when started by a user. In some instances, a mechanism or tool for transparently logging non-deterministic events can be associated with the web application As the web application executes, the transparent logging tool can log non-deterministic events. The transparent logging tool can be associated with the web application by a designer of the web application during a build process or added at a subsequent time and/or by another entity.

Non-deterministic events of the execution can be automatically captured in a manner that is transparent to a user of the web application at block 104. In one case, block 104 can be accomplished via the transparent non-deterministic logging tool mentioned above. The transparent non-deterministic logging tool can be thought of as "transparent" in that the addition of the transparent logging tool need not change the user experience (i.e., the user sees the same thing whether the transparent non-deterministic logging tool is running or not). These logs can be used in various scenarios. For instance, assume that an error occurred in the execution of the web application. In such an instance, blocks 106 and 108 could be performed for a developer of the application.

A record of the captured non-deterministic events can be received at 106. The execution can be recreated utilizing the record of non-deterministic events at 108. For example, the developer could run the program and utilize the non-deterministic events to recreate the scenario that led to the error.

In some cases it may be helpful to think of blocks 102-104 as client side processes and blocks 106-108 as server or back side processes, but such need not be the case. An example of a system that can be described in client side and server side terms is explored in more detail below relative to FIG. 2.

System Examples

Figure 2:
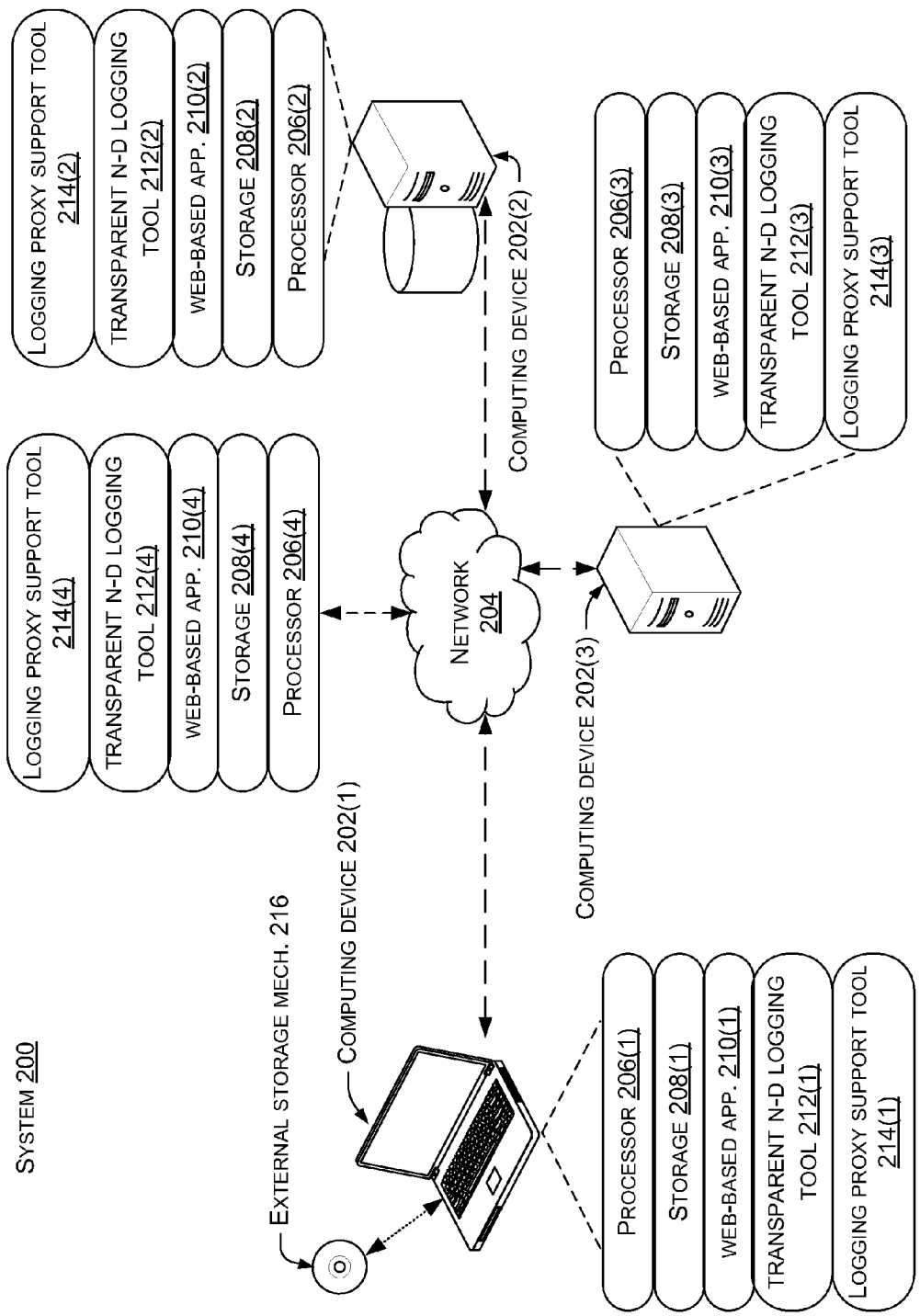
FIG. 2 illustrates a system configured to capture web-based scenarios in accordance with some of the present concepts.

FIG. 2 shows a system 200 that is configured to accomplish the transparent non-deterministic logging described above and below. In this case, system 200 includes first, second, and third computing devices 202(1), 202(2), and 202(3). The computing devices can exchange data over a network 204. Individual computing devices can function in a stand-alone or cooperative manner to achieve transparent non-deterministic logging. In one case, first computing device 202(1) can be thought of as a client-side computing device that is engaged by a user. Similarly, computing device 202(2) can be thought of as a server-side computing device that communicates with the client-side computing device. The server-side computing device may or may not be physically remote from the client-side computing device. Computing device 202(3) can function in a client, server, or other role. Alternatively or additionally, computing device 202(3) can be utilized by a web developer, and communicate with computing devices 202(1) and 202(2) but need not function as either a client or a server.

The term "computing device" as used herein can mean any type of device that has some amount of processing capability. Examples of computing devices can include traditional computing devices, such as personal computers, cell phones, smart phones, personal digital assistants, or any of a myriad of ever-evolving or yet to be developed types of computing devices. Further, a system can be manifest on a single computing device or distributed over multiple computing devices.

In one case, each of computing devices 202(1)-202(3) can include a processor 206, storage 208, and one or more web-based applications or programs 210. Further, the system can include transparent non-deterministic logging tools 212 and logging proxy support tools 214.

Processor 206 can execute data in the form of computer-readable instructions to provide a functionality. Data, such as computer-readable instructions can be stored on storage 208. The storage can include any one or more of volatile or non-volatile memory, hard drives, and/or optical storage devices (e.g., CDs, DVDs etc.), among others. The computing devices 202 can also be configured to receive and/or generate data in the form of computer-readable instructions from an external storage mechanism 216. Examples of external storage mechanisms can include optical storage devices (e.g., CDs, DVDs etc.), hard drives, and flash storage devices (e.g., memory sticks or memory cards), among others. The computing devices may also receive data in the form of computer-readable instructions over network 204 that is then stored on the computing device for execution by its processor.

Web-based application 210 can be manifest as various types of applications. One example which is described below involves the web-based application manifest as a web-browser. In some cases, in addition to being non-deterministic, web-based application 210 can be thought of as being introspective or providing an introspective application environment. For instance, a web-based application can be thought of as introspective where it has the facility for a library to rewrite an environment of code that appears later, such that the later code is constrained by the library. This facility enables the ability to transparently replace event handler registration functions, for example. Some examples of such introspective web applications can include JavaScript™, Silverlight™ and Flash™, among others. For purposes of explanation, a detailed example relative to JavaScript is provided below under the heading "SECOND TRANSPARENT NON-DETERMINISTIC LOGGING EXAMPLE".

In the present implementation, transparent non-deterministic logging can be accomplished via the transparent non-deterministic logging tool 212 and the logging proxy support tool 214. In one configuration, the transparent non-deterministic logging tool 212 can be manifest as a library inside web-based application 210(1) operating in a client side role. Logging proxy support tool 214 can be manifest as a network proxy that helps to replay content transfer events. For example, as a user interacts with the web application on computing device 202(1), the library (i.e., transparent non-deterministic logging tool 212(1)) can record non-deterministic events, including user inputs, network requests and responses, and the results of non-deterministic library calls, such as random number generation. This log can be sent back to the developer working on computing device 202(3) in response to a trigger, such as an unexpected exception being caught.

Once the log has been sent to the developer, the logging proxy support tool 212(3) can provide a replay mode for the developer. The replay mode can recreate the execution of original web application on the developer's unmodified browser. From one perspective, the replay mode can be thought of as providing a "VCR" interface allowing the execution to be viewed in near-real-time, paused, or advanced one event at a time. The internal state of the replaying web application can be inspected using unmodified application debugging tools. This can allow the developer to inspect problematic execution runs from users, analyze a script's performance, and even evaluate the usability of a graphical interface by examining how real users interacted with it.

It is worth noting that other logging systems require a specially instrumented execution environment like a virtual machine or a custom program interpreter. In contrast, the present transparent non-deterministic logging technologies can be implemented entirely in a user-level application to provide event capture on unmodified client browsers.

No existing products log a sufficient set of non-deterministic events, expose a full, browser-neutral environment for logging all sources of browser non-determinism, including both client-side non-determinism like timer interrupts and server-side non-determinism like dynamic image generation.

As mentioned above the present transparent non-deterministic logging technologies can be employed in various scenarios, such as traditional client-server scenarios or a stand-alone scenario where both the transparent non-deterministic logging tool 212 and the logging proxy support tool 212 reside on the same computing device. In another scenario, computing device 202(1) can be a thin computing device with limited storage and/or processing resources. In such a case, processing and/or data storage can occur on computing device 202(2) (and/or upon a cloud of unknown computers connected to network 204). The latter configuration is represented by web-based application 210(4), transparent non-deterministic logging tool 212(4) and the logging proxy support tool 214(4), which have access to network 204, but are not associated with a specific computing device. Results of the cloud processing can then be sent to, and displayed upon, computing device 202(1). Activity on computing device 202(1) can be relayed to, and logged by, transparent non-deterministic logging tool 212(4) rather than directly on computing device 202(1). Also, note that while each of computing devices 202(1)-202(3) is shown with a full complement of components, such need not be the case. For instance, the transparent non-deterministic logging tool may occur on computing device 202(1) utilized by a user, but the logging proxy support tool may not occur on this computing device. Contrastingly, computing device 202(3) that is utilized by the developer may include the logging proxy support tool 214(3) but not the transparent non-deterministic logging tool 212(3).

Second Transparent Non-Deterministic Logging Example

The description that follows in this section relates to implementations where the web-based application is written in JavaScript, a language which provides an introspective application environment. In the discussion in this section the transparent non-deterministic logging technology is referred to as Mugshot™ Recall for the discussion below, that one goal of the present transparent non-deterministic logging technologies is to record the execution of a web application on an end user's machine, then recreate that execution on a developer's machine.

Toward this end some techniques could exhaustively record every intermediate state of the program capture application activity. Mugshot can instead take the approach of recording sources of non-determinism. If an application is run again and injected with the same non-deterministic events, the program will follow the same execution path.

Past systems have recorded non-determinism at the instruction level. However, the former may introduce prohibitive logging overheads, and both require users to modify standard browsers or operating systems. Both approaches also record non-determinism at a granularity that is unnecessarily fine. JavaScript programs are non-preemptively single threaded and event driven. Applications register callback functions for events like key strokes or completion of asynchronous HTTP requests. When the browser detects such an event, it invokes the appropriate application handlers. The browser will not interrupt the execution of one handler to run another. Thus, the execution path of the application is determined by the event interleavings encountered during a particular run. This means that logging the content and the ordering of events provides sufficient information for replay.

Logging non-determinism at the level of JavaScript events could be accomplished by inserting logging code directly into the browser. However, this solution is potentially unappealing to developers, since it may require users to download a special browser or install a logging plug-in. Many users will not opt into such a scheme, dramatically reducing the size and diversity of the developer's logging demographic.

To avoid these problems, some of the present implementations can invoke Mugshot entirely in JavaScript. Compared to an in-browser solution, a JavaScript implementation can be more complex, and can have limitations regarding recording fidelity. However, the in-browser solution has the enormous advantage of being transparent to users and hence much easier to deploy. As will be described in the sections that follow, JavaScript offers sufficient introspection and self-modification capabilities to enable insertion of shims that log most sources of non-determinism.

Capturing Non-Deterministic Events

To add Mugshot recording to an application, the developer can deliver the application through a server-side web proxy (e.g. logging proxy support tool). The server-side web proxy's first job is to insert a single tag at the top of the application's root document: <script src='Mugshot.js'></script>. When the page loads, the Mugshot library runs before the rest of the application code has a chance to execute. Mugshot interposes on the sources of non-determinism that are described below and begins to write to an in-memory log. Event recording can continue until the page is closed.

If the application contains multiple frames, the developer includes the Mugshot <script> tag in each frame. Child frames report all events to the Mugshot library running in the topmost frame; this frame is responsible for collating the aggregate event log and sending it back to the developer.

The developer controls when the application uploads event logs. The application may post logs at predefined intervals, or only if an uncaught exception is thrown. Alternatively, the developer may add an explicit "Send error report" button to the application which triggers a log post.

Table 1 lists examples of various sources of non-determinism in web applications. The sub-sections below discuss each of the broad categories and describe how to capture them on Firefox and IE.

TABLE 1

| | Event type | Examples | Captured by Mugshot |
|---|---|---|---|
| DOM Events | Mouse | click, mouseover | Yes |
| §3.1.3 | Key | keyup, keydown | Yes |
| | Loads | load | Yes |
| | Form | focus, blur, select, change | Yes |
| | Body | scroll, resize | Yes |
| Interrupts | Timers | setTimeout(f, 50) | Yes |
| §3.1.2 | AJAX | req.onreadystatechange = f | Yes |
| Nondeterministic functions | Time query | (new Date( )).getTime( ) | Yes |
| §3.1.1 | Random number query | Math.random( ) | Yes |
| Test selection | Firefox: window.getSelection( ) | Highlighting text w/mouse | Yes |
| §3.1.8 | IE: document.selection | Highlighting text w/mouse | Partially |
| Opaque browser objects | Flash movie | User pauses movie | No |
| §3.1 | Java applet | Applet updates the screen | No |

In this implementation, Mugshot does not log events for media objects that are opaque to JavaScript code. For example, Mugshot does not record when users pause a Flash movie or click a region inside a Java applet. Since these objects do not expose a JavaScript accessible event interface, Mugshot can make no claims about their state. Nor does the current implementation of Mugshot capture non-deterministic events arriving from the opaque container, for example, via Flash's ExternalInterface. While such events would cause Mugshot replay to diverge, they are rarely used in practice. To summarize, in some implementations, Mugshot can log these externally arriving events even if some aspect of the external event is opaque.

For each new captured event, Mugshot can create a log entry containing a sequence number and the wall clock time. The record also can contain the event type and enough type-specific data to recreate the event at replay time. For example, for keyboard events, Mugshot records the GUI element that received the event, the character code for the relevant key, and whether any of the shift, alt, control, or meta keys were simultaneously pressed.

Non-Deterministic Function Calls

Applications call new Date( ) to get the current time and Math.random( ) to get a random number. To log time queries, Mugshot wraps the original constructor for the Date object with one that logs the returned time. To log random number generation, Mugshot replaces the built-in Math.random( ) with a simple linear congruential generator. Mugshot uses the application's load date to seed the generator, and it writes this seed to the log. Given this seed or return value, subsequent calls to the random number generator are deterministic and do not require subsequent log entries.

Interrupts

JavaScript interrupts allow applications to schedule callbacks for later invocation. Callbacks can be scheduled for one-time execution using setTimeout(callback, waitTime). A callback can be scheduled for periodic execution using setInterval(callback, period). JavaScript is cooperatively single threaded, so interrupt callbacks (and event handlers in general) execute atomically and do not preempt each other.

Mugshot logs interrupts by wrapping the standard versions of setTimeout( ) and setInterval( ) The wrapped registration functions take an application-provided callback, wrap it with logging code, and register the wrapped callback with the native interrupt scheduler. Mugshot also assigns the callback a unique id; since JavaScript functions are first class objects, Mugshot stores this id as a property of the callback object. Later, when the browser invokes the callback, the wrapper code logs the fact that a callback with that id executed at the current wall clock time.

Although simple in concept, IE (Internet Explorer™) does not support this straightforward interposition on setTimeout( ) and setInterval( ) Mugshot's modified setTimeout( ) holds a reference to the browser's original setTimeout( ) entry point; however, IE sometimes garbage collects this reference, leading to a "function not defined" error from the Mugshot wrapper. To mitigate this problem, Mugshot creates an invisible <iframe> tag, which comes with its own namespace and hence its own references to setTimeout( ) and setInterval. The Mugshot wrapper invokes copies of these references when it needs to schedule a wrapped application callback.

Although this trick gives Mugshot references to the native scheduling functions, it can prevent Mugshot from actually scheduling callbacks until the hidden frame is loaded. This potential problem can have three cascading consequences. First, since JavaScript is single-threaded, Mugshot cannot block until the hidden frame is loaded without hanging the application. Instead, it must queue application timer requests and install them once the hidden frame loads. Second, JavaScript timer requests return opaque scheduling identifiers that the application can use to clearTimeout and clearInterval. For these early requests, Mugshot generates synthetic identifiers and maintains a map to the real identifiers it acquires later. Finally, an application may even clear an interrupt before the hidden frame loads; Mugshot responds by simply removing the callback from its queue of requests.

AJAX requests allow JavaScript applications to issue asynchronous web fetches. The browser represents each request as an XMLHttpRequest object. To receive notifications about the status of the request, applications assign a callback function to the object's onreadystatechange property. The browser invokes this function whenever new data arrives or the entire transmission is complete. Upon success or failure, the various properties of the object contains the status code for the transfer (e.g., 200 OK) and the fetched data.

Mugshot employs different techniques to wrap AJAX callbacks on different browsers. On Firefox, Mugshot's wrapped XMLHttpRequest constructor registers a DOM 2-style handler (described fully in the next sub-section) on the request object to capture the onreadystatechangeevent. On IE, which does not support DOM 2-style handlers on this object, Mugshot interposes on the request object's sendmethod to wrap the handler as it is passed in from the application.

For each update, Mugshot logs the state of the request (e.g., waiting for data), any incremental data that has already returned, any response headers set by the application, and any status codes set by the browser.

DOM Events

The Document Object Model (or DOM) is the interface between JavaScript applications and the browser's user interface. Using DOM calls, JavaScript applications register handlers for user events like mouse clicks. DOM methods also allow the application to dynamically modify page content and layout.

The browser binds every element in a page's HTML to an application-accessible JavaScript object. The application attaches event handlers to these DOM objects, signifying the code that the browser should invoke when a DOM node generates a particular event. In the simplest handler registration scheme, applications simply assign functions to specially-named DOM node properties. For example, to execute code whenever the user clicks on a <div> element, the application assigns a function to the onclick property of the corresponding JavaScript DOM node.

This simple model, called DOM Level 0 registration, only allows a single handler to be assigned to each DOM node/event pair. Modern browsers also implement the DOM 2 model, which allows an application to register multiple handlers for a particular DOM node/event pair. An application calls the node's attachEvent( ) (IE) or addEventListener( ) (Firefox) method, passing an event name (like "click"), a callback, and in Firefox, a useCaptureflag to be discussed shortly.

Figure 3:
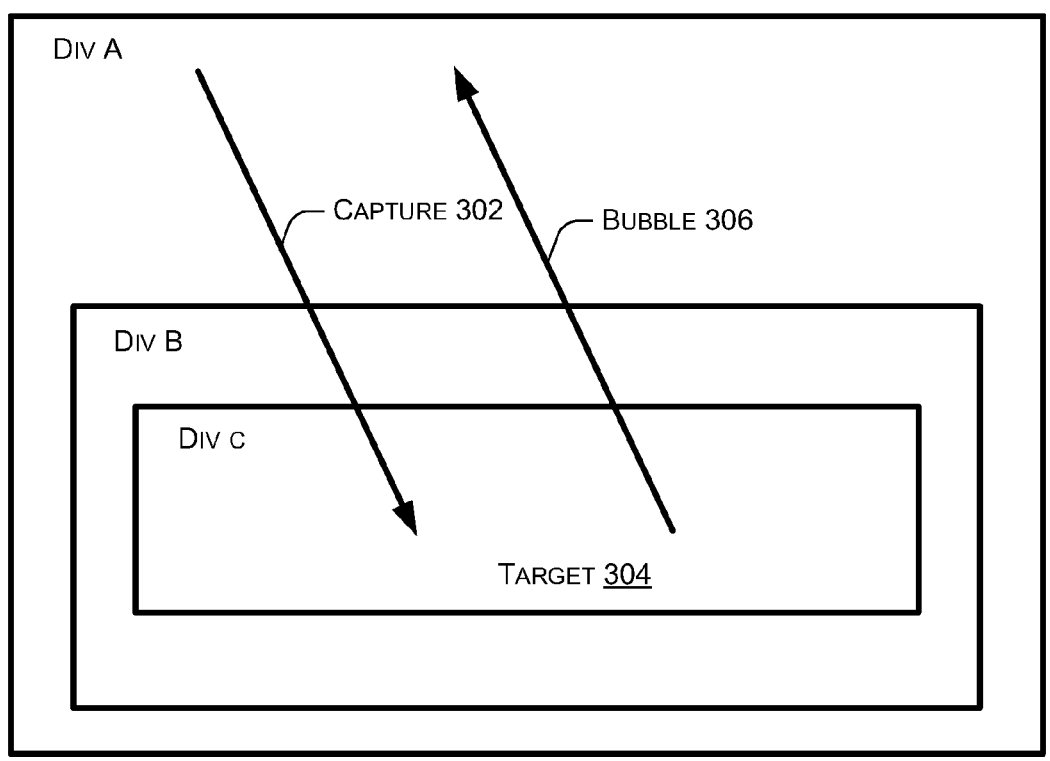
FIG. 3 illustrates a document object model (DOM) tree event sequence in accordance with some of the present concepts.

The World Wide Web Consortium's DOM Level 2 specification defines a three-phase dispatch process for each event as illustrated in FIG. 3.

FIG. 3 shows a Level 2 Dom tree 300 that includes three nested DOM elements; Div A, Div B, and Div C. In a capturing phase 302, the browser hands the event to the special window (e.g., Div A) and document JavaScript objects. The event then traces a path down the DOM tree 200, starting at the top-level <html> DOM node (e.g., DIV. A) and eventually reaching the DOM node (e.g., Div C) that actually generated the event and can thus be thought of as the 'target'. The boolean parameter in addEventListener( ) allows a handler to be specified as 'capturing'. Capturing handlers are only executed in the capturing phase; they allow a DOM node to execute code when a child element has generated an event. Potentially importantly, the ancestor's handler will be called before any handlers on the child run.

In the target phase 304, the event is handed to the DOM node that generated it (e.g., Div C). The browser executes the appropriate handlers at the target, and then sends the event along the reverse capturing path. In this final bubbling phase 306, ancestors of the target can run event handlers marked as bubbling, allowing them to process the event after it has been handled by descendant nodes.

In the DOM 2 model, some event types are cancelable, i.e., an event handler can prevent the event from continuing through the three phase process. Also, although all events capture, some do not bubble. For example, load events, which are triggered when an image has completely downloaded, do not bubble. Form events also do not bubble. Examples of form events include focus and blur, which are triggered when a GUI element like a text box gains or loses input focus.

The code corresponding to FIG. 3 includes:

```
<div onclick='handlerA( )'>
    <div onclick='handlerB( )'>
        <div onclick='handlerC( )'>
        </div>
    </div>
</div>
```

To summarize, FIG. 3 shows event handling after a user clicks within Div C. In the W3C model's capturing phase, handlerA( ) is called if it is a capturing handler, followed by handlerB( ) if it is a capturing handler. After the target's handlerC( ) is called, IE and W3C both mandate a bubbling phase, in which handlers marked as bubbling are called from the inside out.

DOM Events and Firefox

Firefox supports the W3C model for DOM events. Thus, Mugshot can record these events in a straightforward way—it simply attaches capturing logging handlers to the window object. Since the window object is the highest ancestor in the DOM event hierarchy, Mugshot's logging code is guaranteed to catch every event before it has an opportunity to be canceled by other nodes in the capture, target, or bubble phases.

Mugshot does need to ensure that the application does not accidentally delete or overwrite its logging handlers. To accomplish this, Mugshot registers the logging handlers as DOM 2 callbacks, exploiting the fact that applications cannot iterate over the DOM 2 handlers for a node, and they cannot deregister a DOM 2 handler via domNode.detachEvent (eventName, callback) without knowing the callback's function pointer.

Mugshot also ensures that its DOM 2 window handlers run before any application-installed window handlers execute and potentially cancel an event. Stated another way, Mugshot can block an attempt to cancel an event to avoid loss of non-deterministic information. Firefox invokes a node's DOM 2 callbacks in the order that they were registered; since the Mugshot library registers its handlers before any application code has run, its logging callbacks are guaranteed to run before any application-provided DOM 2 windowhandlers.

Unfortunately, Firefox invokes any DOM 0 handler on the node before invoking the DOM 2 handlers. To ensure that Mugshot's DOM 2 handler runs before any application-provided DOM 0 callback, Mugshot uses JavaScript setters and getters to interpose on assignments to DOM 0 event properties. Setters and getters define code that is bound to a particular property on a JavaScript object. The setter is invoked on read accesses to the property, and the getter is invoked on writes.

In some implementations Mugshot would ideally define a DOM Level 2 logging handler for each event type 'e', and create setter code for the window.eproperty which wrapped the user-specified handler with a Mugshot-provided logging function. If the application provided no DOM 0 handler, Mughshot's DOM 2 callback would log the event; otherwise, the wrapped DOM 0 handler would log the event and set a special flag on the event object indicating that Mugshot's DOM 2 handler should not duplicate the log entry. Unfortunately, Firefox's getter/setter implementation is buggy. Mugshot can create a getter for a DOM node property, and application writes to the property will properly invoke the setter. However, when an actual event of type e is generated, the browser will not invoke the associated function. In other words, the setter code, which works perfectly at the application level, hides the event handler from the internal browser code.

Luckily, the setter code does not prevent the browser from invoking DOM 2 handlers. Thus, Mugshot's setter also registers the application-provided handler as a DOM 2 callback. The setter code ensures that when the application overwrites the DOM 0 property name, Mugshot deregisters the shadowed DOM 2 version of the old DOM 0 handler.

When Mugshot logs a DOM event, it records an identifier for the DOM node target. If the target has an HTML id, e.g., <div id='foo'>, Mugshot tags the log entry with that id. Otherwise, it identifies the target by specifying the capturing path from the root <html> tag. For example, the id specifies that the target can be reached by following the first child of the <html> tag and then the fifth child of that node. Since many JavaScript applications use dynamic HTML, the path for a particular node may change throughout a program's execution. Thus, determination of a target's path id is done at the time the event is seen—rather than being deferred until, for example, the time that the log is posted to the developer.

DOM Events and IE

IE's event model is only partially compatible with the W3C model. One important difference is that IE does not support the capturing phase of event propagation. This introduces two complications. First, an event may never have an opportunity to bubble up to a window-level logging handler—the event might be canceled by a lower-level handler, or it may be a non-bubbling event like a load. Second, even if an event bubbles up to a window-level logger, the event may have triggered lower-level event handlers and generated loggable non-deterministic events. For example, a mouse click may trigger a target-level callback that calls new Date( ). The mouse click is temporally and causally antecedent to the time query. However, the mouse click would be logged after the time query, since the time query is logged at its actual generation time, whereas the mouse click is logged after it has bubbled up to the window-level handler.

Mugshot addresses these problems using several techniques. To log non-bubbling events, Mugshot exploits IE's facility for extending the object prototypes for DOM nodes. For DOM types like Images and Inputs which support non-bubbling events, Mugshot modifies their class definitions to define custom setters for DOM 0 event properties. Mugshot also redefines attachEvent( ) and detachEvent( ) the mechanisms by which applications registers DOM 2 handlers for these nodes. The DOM 0 setters and the wrapped DOM 2 registration methods collaborate to ensure that if the application defines at least one handler for a DOM node/event pair, Mugshot will log relevant events precisely once, and before any application-specified handler can cancel the event.

Mugshot could use the same techniques to capture bubbling events at the target phase. Unfortunately, IE's DOM extension facility is fragile: redefining certain combinations of DOM 0 properties can cause unpredictable behavior. Therefore, Mugshot falls back on window-level handlers to log bubbling events, the problematic technique described above that may lead to temporal violations in the log where a causally antecedent event is logged after a non-deterministic effect. Mugshot can mitigate this problem in IE, because IE stores the current DOM event in a global variable window-.event. Whenever Mugshot needs to log a source of non-determinism, it first checks whether window.event is defined and refers to a not-yet-logged event. If so, Mugshot logs the event before examining the causally dependent event.

The application may cancel a bubbling event before it reaches Mugshot's window-level handler by setting its Event.cancelBubble property to true. The event still must be logged, so Mugshot extends the class prototype for the Event object, overriding its cancelBubble setter to log the event before its cancellation.

In summary, Mugshot on IE logs all bubbling DOM events, but only the non-bubbling events for which the application has installed handlers. This differs from Mugshot's behavior on Firefox, where it logs all DOM events regardless of whether the application cares about them. Logging events that cannot trigger application handlers wastes log space, but it does not affect correctness at replay time, since events that were ignored at logging time are also ignored at replay time.

Handling Load Events on IE

In IE, load events do not capture or bubble. Using the techniques described in the previous sub-section, Mugshot can capture these events for elements with application-installed load handlers. However, Mugshot may actually need to capture all load events so that at replay time, it can render images in the proper order and ensure that the page layout unfolds in the same fashion observed at logging time. Otherwise, an application that observes the document layout may see a different intermediate layout at replay time, causing divergence.

Mugshot could ideally modify the prototype for Image objects such that whenever the browser created an Image node, the node would automatically install a logging handler for load events. Unfortunately, prototype extension only works for properties and methods accessed by application-level code—the browser's native code creation of the DOM node cannot be modified by extending the JavaScript-level prototype. So, Mugshot uses a hack: whenever it logs an event, it schedules a timeout to check whether that event has created new Image nodes; if so, Mugshot explicitly adds a DOM 2 logging handler which records load events for the image. Mugshot specifies this callback by invoking a non-logged setTimeout(imageCheck, 0). The 0 value for the timeout period makes the browser invoke the imageCheckcallback "as soon as possible." Since the timeout is set from the context of an event dispatch, the browser will invoke the callback immediately after the dispatch has finished, but before the dispatch of other queued events (such as the load of an image to log). Note that Mugshot performs this image check at the end of the initial page parse to catch the loading of the page's initial set of images.

Synthetic Events

Applications can call DOMnode.fireEvent( ) on IE and DOMnode.dispatchEvent( ) on Firefox to generate synthetic events. Mugshot uses these functions at replay time to simulate DOM activity in the log. Stated another way, the synthetic events can be utilized to aid in replaying a captured event that alone may be insufficient for replay. However, the application being logged can also call these functions. These synthetic events are handled synchronously by the browser; thus, from Mugshot's perspective, they are deterministic program outputs which do not need to be logged. In terms of the event dispatching path, the browser treats the fake events just like real ones, so they will be delivered to Mugshot's logging infrastructure.

To prevent these events from getting logged on Firefox, Mugshot interposes on document.createEvent( ) which applications must call to create the fake event that will be passed to dispatchEvent( ) The interposed document.createEvent( ) assigns a special doNotLog property to the event before returning it to the application. Mugshot's logging code will refuse to log an event that defines this property.

This technique does not work on IE, which prohibits the addition of new properties to the Event object. Thus, Mugshot uses prototype extension to interpose on fireEvent( ) Inside the interposed version, Mugshot pushes an item onto a stack before calling the native fireEvent( ) after the call returns, Mugshot pops an item from the stack. In this fashion, if Mugshot's logging code for DOM events notices a non-empty stack, it knows that the current DOM event is a synthetic event and should not be logged.

Annotation Events

Mugshot dispatches synthetic events to replay DOM activity. These events are indistinguishable from the real ones with respect to the three phase dispatch cycle (or the two phase one on IE)—given any application state, a synthetic event will cause the exact same handlers to execute in exactly the same order as a semantically equivalent real event. However, it is worth noting that synthetic events did not always update the visible browser state in the expected way. In particular, the following problems were found on both Firefox and IE:

First, according to the DOM specification, when a keypress event has finished the dispatch cycle, the target text input or content-editable DOM node should be updated with the appropriate key stroke. Experimentation showed that this did not happen reliably. For example, synthetic key events could be dispatched to a text entry box, but the value of the box would not change, despite the fact that the browser invoked all of the appropriate event handlers.

Second, <select> tags implement drop-down selection lists. Each selectable item is represented by an <option> tag. Dispatching synthetic mouse clicks to <option> nodes should cause changes in the selected item of the parent <select> tag. Neither Firefox nor IE provided this behavior.

Third, users can select text or images on a webpage by dragging the mouse cursor or holding down the shift key while tapping a directional key. The browser internally represents the selected text as a range of underlying DOM nodes. The browser visibly represents the selection by highlighting the appropriate text and/or images. Applications access the selection range by calling window.getSelection( ) on Firefox and accessing the document.selectionobject on IE. Observation indicates that dispatching synthetic key and mouse events could not reliably update the browser's internal selection range, nor reliably recreate the appropriate visual highlighting.

To properly replay these DOM events, Mugshot defines special synthetic annotation events. Annotation events are "helper" events for events which, if replayed by themselves, would not produce a faithful recreation of the logging-time application state. Mugshot inserts an annotation event into the log immediately after a DOM event with low fidelity replay. At replay time, Mugshot dispatches the low fidelity synthetic event, causing the appropriate event handlers to run. Mugshot then executes the associated annotation event, finishing the activity induced by the prior DOM event. Potentially importantly, annotation events are not real events, so they do not trigger application-defined event handlers. Instead, annotation events merely define work that Mugshot performs at replay time to provide faithful emulation.

To fix low-fidelity keypress events on text inputs, Mugshot's keypresslogger schedules a timeout interrupt with an expiration time of 0. The browser executes the callback immediately after the end of the dispatch cycle for the keypress, allowing Mugshot to log the value of the text input. At replay time, after dispatching the synthetic keypress, Mugshot reads the value annotation from the log and programmatically assigns the value to the target DOM node's valueproperty.

To ensure that clicks on <option> elements actually update the chosen item for the parent <select> tag, Mugshot's mouseup logger checks whether the event target is a <select> tag. If so, this indicates that the user has selected a new choice. Mugshot generates an annotation indicating which of the <select> tag's children was clicked upon. At replay time, Mugshot uses the annotation to directly set the selectedIndex property of the <select> tag.

Mugshot generates annotation events for selection ranges after logging keyup and mouseup events. On Firefox, the selection object conveniently defines a starting DOM node, a starting position within that node, an ending DOM node, and an ending position within that node. Mugshot adds the relevant DOM node identifiers and integer offsets to the annotation record. Abstractly speaking, Mugshot includes the same information for an annotation record on IE. However, IE does not provide a straightforward way to determine the exact extent of a selection range. So, Mugshot cobbles together several IE range primitives to deduce the current range. Mugshot first determines the highest enclosing parent tag for the currently selected range. Then, Mugshot creates a range which covers all of the parent tag's children, and progressively shrinks the number of HTML characters it contains, using IE's Range.in Range( ) to determine whether the actual select region resides within the shrinking range. At some point, Mugshot will determine the exact amounts by which to shrink the left and right margins of the parent range to precisely cover the actual selected region. Mugshot logs the DOM identifier for the parent node and the left and right pinch margins.

Performance Optimizations

Both Firefox and IE support the W3C mousemove event, which is fired whenever the user moves the mouse. Mugshot can log this event like any other mouse action, but this can lead to unnecessary log growth in Firefox if the application does not care about this event (remember that Mugshot on Firefox logs all DOM events, regardless of application interest in them). Mugshot logs these events by default, but since few applications use mousemove handlers, the developer can disable their logging to reduce log size.

Games which have high rates of keyboard or mouse events may generate many text selection annotation events. Generating these annotations is expensive on IE since Mugshot experimentally determines the selection range. Furthermore, games do not typically care about the selection zones that their GUI inputs may or may not have created. Thus, for games with high event rates selection annotation can be disabled.

Replay

Compared to the logging process, replay is straightforward. The most complexity arises from replaying load events, since JavaScript code cannot modify the network stack and stall data transmissions to recreate logging-time load orderings. Thus, Mugshot coordinates load events with a transparent caching proxy that the developer inserts between his web server and the outside world.

In addition, Mugshot shields the replaying execution from new events that arise on the developer machine, e.g., because the developer accidentally clicks on a GUI element in the replaying application. Without a barrier for such new events, the replaying program may diverge from the execution path seen at logging time.

Caching Web Content at Logging Time

When a user fetches a page logged by Mugshot, the fetch is mediated by a transparent Mugshot proxy. The proxy assigns a session ID to each page fetch. This session ID is stored in a cookie and later written to the Mugshot log. As the proxy returns content to the user, it updates a per-session cache mapping content URLs to the data that it served for those URLs during that particular session. Optionally, the cache can rewrite static <html> and <frame> declarations to include the MugShot library's<script> tag.

Replaying Load Events

At replay time, the developer switches the proxy into replay mode, sets the session ID in his local Mugshot cookie to the appropriate value, and directs his web browser to the URL of the page to replay. The proxy extracts the session ID from the cookie, determining the cache it should use to serve data. The proxy then begins to serve the application page, replacing any static <script> references to the logging Mugshot library to references to the Mugshot replay library.

During the HTML parsing process, browsers load and execute <script> tags synchronously. The Mugshot replay library is the first JavaScript code that the browser runs, so Mugshot can coordinate load interleavings with the proxy before any load requests have actually been generated. During its initialization sequence, Mugshot fetches the replay log from the developer's log server and then sends an AJAX request to the proxy indicating that the proxy should only complete the loads for subsequent non-<script> in response to explicit "release load" messages from Mugshot.

The rest of the page loads, with any <scripts> loading synchronously. The browser may also launch asynchronous requests for images, frame source, etc. These asynchronous requests queue at the proxy. Later, as the developer rolls forward the replay, Mugshot encounters load events for which the corresponding browser requests are queued at the server. Before signaling the proxy to transmit the relevant bytes, Mugshot installs a custom DOM 2 loadhandler for the target DOM node so that it can determine when the load has finished (and thus when it is safe to replay the next event).

The Replay Interface

At replay initialization time, Mugshot places a semitransparent <iframe> overlaying the application page. This frame acts as a barrier for keyboard and mouse events, preventing the developer from issuing events to the replaying application that did not emerge from the log. Some implementations embed a VCR-like control interface in the barrier frame which allows the developer to start or stop replay. The developer can single-step through events or have Mugshot dispatch them at fixed intervals. Mugshot can also try to dispatch the events in real time, although "real-time" playback of applications with high event rates may have a slowdown factor of 2 to 4 times.

Whenever Mugshot replays an event, it can optionally place a small, semi-translucent square above the target DOM node. These squares are color-coded by event type and fade over time. They allow the developer to visually track the event dispatch process, and are particularly useful for understanding mouse movements.

Replaying Non-loadEvents

Replaying events is considerably simpler than logging them. To replay a non-load DOM event, Mugshot locates the target DOM node and then dispatches the appropriate synthetic event. For low-fidelity events, Mugshot also performs the appropriate fix-ups using annotation records. To replay text selection events, Mugshot recreates the appropriate range object and then uses a browser-specific call to activate the selection.

To replay timeout and interval callbacks, Mugshot's initialization code interposes on setTimeout( ) and setInterval( ). The interposed versions tag each application-provided callback with an interrupt ID and add the callback to a function cache. This cache is built in the same order that IDs are assigned at logging time, so interrupt IDs are guaranteed to be faithful. Mugshot does not register the application-provided callback with the native interrupt scheduler. Instead, when the log indicates that an interrupt should fire, Mugshot simply retrieves the appropriate function from its cache and executes it. Mugshot interposes on the cancellation functions clearTimeout ( ) and clearInterval( ) but the interposed version are no-ops: if the application canceled an interrupt at logging time, Mugshot will not encounter it in the log at replay time.

Mugshot also interposes on the XMLHttpRequest constructor. Much like interrupt replay, Mugshot stores AJAX callbacks in a function cache and executes them at the appropriate time. Mugshot updates each synthetic AJAX request with the appropriate log data before passing it to the application AJAX handler.

By interposing on the Date( ) constructor, Mugshot forces time queries to read values from the log. The log also contains the initialization seed used by the random number generator at capture time. Mugshot uses this value to seed the replay-time generator. This is sufficient to ensure that subsequent calls to Math.random( ) replay faithfully.

Privacy

Mugshot provides developers with an extremely detailed log of user behavior. Some might worry that this leads to an unacceptable violation of user privacy. Such privacy concerns are valid. However, web sites can (and should) provide an "opt-in" policy for Mugshot logging, similar to how Windows users must willingly decide to send performance data to Microsoft Corp.

It is also noteworthy that Mugshot is not a fundamentally new threat to online privacy. Web developers already have the ability to snoop on users to the extent allowed by JavaScript, and to send the resulting data back to their own web servers. The scope of such snooping is limited by the browser's cross-site scripting policies, and from the browser's perspective, Mugshot is not a special case: it is subject to exactly the same restrictions designed to thwart malware. These restrictions prevent all programs—including Mugshot—from snooping on a frame owned by one domain and sending that data to a different domain. The only data that can be sent to a server is data collected from a frame that came from that same server.

The above section describes come of the present implementations at a very detailed level. Further, it is noted that specific techniques are described above to allow Mugshot to run on presently available browsers. Those techniques may be altered for use with other and/or future browsers. However, in any of these scenarios Mugshot can leverage the fundamental insight that JavaScript is sufficiently introspective to support the logging and replay of JavaScript-based applications. Broad methods that are consistent with the above description and/or future implementations are described below.

Event Logging Method Example

Figure 4:
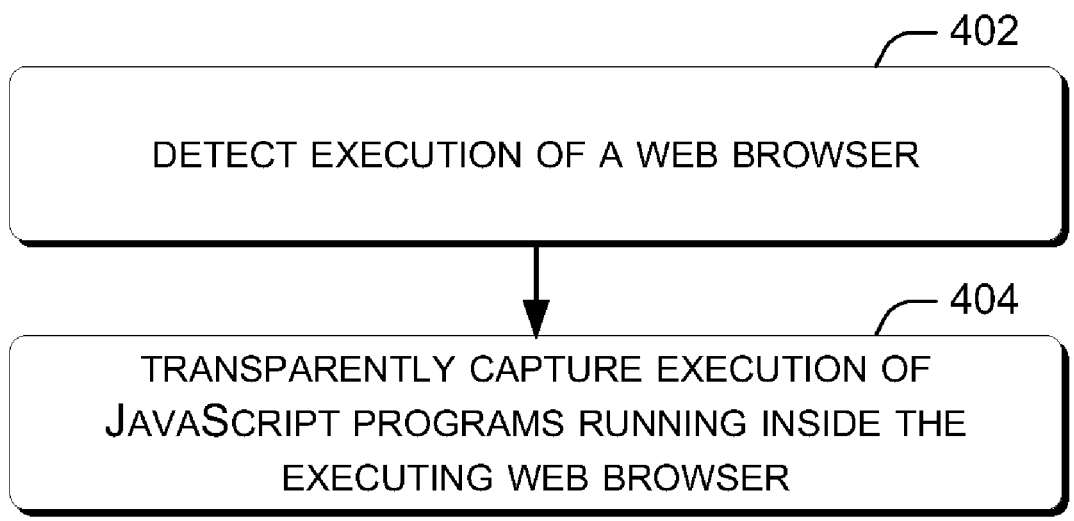

FIG. 4 illustrates a flowchart of a process, technique, or method 400 that is consistent with at least some implementations of the present transparent logging concepts.

Block 402 detects execution of a web browser. Examples of web browsers are described above.

Block 404 transparently captures execution of JavaScript programs running inside the executing web browser. For instance, upon detection of the executing web-browser some implementations ensure that a transparent non-determinative JavaScript logging tool is automatically launched without user input.

The order in which the above listed methods are described is not intended to be construed as a limitation, and any number of the described blocks or acts can be combined in any order to implement the method, or an alternate method. Furthermore, the method can be implemented in any suitable hardware, software, firmware, or combination thereof such that a computing device can implement the method and/or cause the method to be implemented. In one case, the method is stored on a computer-readable storage media as a set of instructions such that execution by a computing device causes the method to be performed.

CONCLUSION

Although techniques, methods, devices, systems, etc., pertaining to capturing web-based scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer-readable storage device having instructions stored thereon that when executed by a computing device causes acts to be performed, comprising:
    detecting execution of a web browser; and, transparently capturing execution of JavaScript programs running inside the executing web browser, the transparently capturing comprising recording at least one non-deterministic event having timing or content not solely determined by code of the JavaScript programs, the recording comprising logging a JavaScript interrupt by wrapping a corresponding application-provided callback with logging code, registering the application-provided callback with a native interrupt scheduler, assigning the application-provided callback a unique callback identification (id), and storing the unique callback id as a property of a callback object.

2. A computer-readable storage device of claim 1, wherein the transparently capturing further comprises only capturing the at least one non-deterministic event.

3. A computer-readable storage device of claim 1, wherein the transparently capturing further comprises running a JavaScript library in the JavaScript programs.

4. A method, comprising:
    detecting execution of a web application, the execution associated with a user experience;
    automatically capturing non-deterministic events of the execution without changing the user experience in a manner that is transparent to a user of the web application, the automatically capturing comprising automatically capturing a Document Object Model (DOM) event on a log; and
    inserting a synthetic annotation event into the log after the captured DOM event, the synthetic annotation event contributing to a subsequent replay of the captured DOM event.

5. The method of claim 4, wherein the automatically capturing further comprises automatically capturing non-deterministic events external network events.

6. The method of claim 4, wherein the automatically capturing further comprises automatically capturing non-deterministic events comprising a return value of non-deterministic function calls.

7. The method of claim 4, further comprising blocking the web application from cancelling the captured DOM event in a manner that would prevent the subsequent replay of the captured event.

8. The method of claim 4, further comprising utilizing a network proxy that allows externally loaded data objects to be loaded at replay time in a same order as during the execution.

9. The method of claim 4, further comprising utilizing a network proxy that allows externally loaded data objects to be loaded at replay time in a same order and with identical content as during the execution.

10. The method of claim 4, in an instance where the web application is a multiple component application, further comprising capturing the non-deterministic events as well as a respective interleaving order relative to multiple components of the multiple component application.

11. A system, comprising:
a web browser comprising a JavaScript application configured to execute on a user's computer;
a transparent non-deterministic logging tool manifest as a library configured to:
- run inside the web browser and to capture a non-determinative event on a log, the non-determinative event occurring during the execution of the JavaScript application and having a low fidelity replay; and
- insert a synthetic annotation event that did not occur during the execution of the JavaScript application into the log relative to the non-deterministic event; and
a logging proxy support tool manifest as a network proxy configured to replay the execution of the JavaScript application utilizing the non-determinative event and the synthetic annotation event.

12. The system of claim 11, wherein the logging proxy support tool is further configured to receive the library upon failure of the web browser.

13. The system of claim 11, wherein the logging proxy support tool is further configured to block user input during the replay.

14. The system of claim 11, wherein the transparent non-deterministic logging tool is manifest in a programming language that provides an introspective execution environment.

15. The system of claim 11, wherein the transparent non-deterministic logging tool is further configured to automatically start-up upon start-up of the web browser.

16. The system of claim 11, wherein the system consists of a single computing device, and wherein the computing device includes a processor and wherein the processor executes the web browser and the transparent non-deterministic logging tool.

17. The system of claim 11, wherein the transparent non-deterministic logging tool is further configured to be installed and run on the system without modifying the web browser or requiring an action by the user.

* * * * *